United States Patent
Jao et al.

(10) Patent No.: US 10,587,312 B1
(45) Date of Patent: Mar. 10, 2020

(54) TRANSMISSION INTERFACE HAVING NOISE REDUCTION FUNCTION

(71) Applicant: Richtek Technology Corporation, Zhubei, Hsinchu (TW)

(72) Inventors: Tong-Cheng Jao, Taichung (TW); Yi-Wei Lee, Taipei (TW); Isaac Y. Chen, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/532,531

(22) Filed: Aug. 6, 2019

(30) Foreign Application Priority Data

Oct. 19, 2018 (CN) .......................... 2018 1 1220104

(51) Int. Cl.
| | | |
|---|---|---|
| *H01F 27/42* | (2006.01) | |
| *H04B 5/00* | (2006.01) | |
| *H04B 15/02* | (2006.01) | |

(52) U.S. Cl.
CPC .......... *H04B 5/0031* (2013.01); *H04B 5/005* (2013.01); *H04B 5/0087* (2013.01); *H04B 15/02* (2013.01)

(58) Field of Classification Search
None
See application file for complete search history.

(56) References Cited

U.S. PATENT DOCUMENTS

| | | | | | |
|---|---|---|---|---|---|
| 5,477,145 | A * | 12/1995 | Takahashi | ........ | G01R 33/34046 324/318 |
| 5,818,672 | A * | 10/1998 | Hilbe | ...................... | H04B 15/00 361/43 |
| 6,741,700 | B1 * | 5/2004 | Kwan | .................. | H04M 11/062 379/349 |
| 6,822,614 | B2 * | 11/2004 | Chiu | ......................... | H01Q 7/08 343/741 |
| 7,439,863 | B2 * | 10/2008 | Suzuki | ............... | G06K 7/10178 340/572.7 |
| 7,446,729 | B2 * | 11/2008 | Maruyama | ....... | G06K 19/07749 343/742 |
| 8,723,649 | B2 * | 5/2014 | Lavedas | ............... | H01Q 1/2216 340/10.1 |
| 8,770,489 | B2 * | 7/2014 | Kato | .................... | H04B 5/0075 235/494 |
| 9,065,169 | B2 * | 6/2015 | Chamberlin | ............. | H04B 1/06 |
| 9,548,621 | B2 * | 1/2017 | Asanuma | ................ | H01F 38/14 |

(Continued)

*Primary Examiner* — Tuan A Tran
(74) *Attorney, Agent, or Firm* — Tung & Associates

(57) ABSTRACT

A transmission interface with noise reduction function includes a first circuit and a second circuit, for transmitting a signal from the first circuit to the second circuit or from the second circuit to the first circuit. The first circuit includes a first sub-winding and a first wire unit, and the second circuit includes a second sub-winding and a second wire unit. When an electromagnetic noise passes through the first sub-winding and the first wire unit, two loop currents are respectively generated, and the currents have opposite directions to cancel each other so as to reduce the electromagnetic noise. Or, when an emitting current corresponding to the signal flows through the first sub-winding and the first wire unit, two magnetic fields are respectively generated, and the magnetic fields have opposite directions to cancel each other so as to reduce the electromagnetic interference.

23 Claims, 13 Drawing Sheets

(56) References Cited

U.S. PATENT DOCUMENTS

| | | | |
|---|---|---|---|
| 9,570,935 B2* | 2/2017 | Miyamoto | H02J 7/025 |
| 10,062,956 B2* | 8/2018 | Ito | H04B 5/0075 |
| 10,158,256 B2* | 12/2018 | Asanuma | H01F 38/14 |
| 2009/0302841 A1* | 12/2009 | Avdievich | G01R 33/3415 |
| | | | 324/309 |
| 2013/0113297 A1* | 5/2013 | Miyamoto | H02J 7/025 |
| | | | 307/104 |
| 2017/0012475 A1* | 1/2017 | Zhang | H02J 7/025 |

* cited by examiner

⊙ : Electromagnetic Noise MNS

TRANSMISSION INTERFACE HAVING NOISE REDUCTION FUNCTION

CROSS REFERENCE

The present invention claims priority to CN 201811220104.8, filed on Oct. 19, 2018.

BACKGROUND OF THE INVENTION

Field of Invention

The present invention relates to a transmission interface having noise reduction function. In particular, the present invention relates to such transmission interface with noise reduction function, which is capable of reducing noise by loop currents or magnetic fields generated by the sub-windings and the wire units, wherein the loop currents or magnetic fields have different directions opposite to each other.

Description of Related Art

Typically, if a prior art transmission interface needs to transmit a signal by means of electromagnetic induction (e.g., a pair of coils or a transformer), a large area is required. However, a large induction area is more likely to be interfered by an external magnetic field, or more likely to cause electromagnetic interference to other circuits. In such prior art, a mask is typically adopted to block such undesirable noise interference. However, it is not easy to well place a mask with high quality and accuracy. And, the existence of a mask occupies a significant space, which is disadvantageous to product size reduction.

In the development trend of product size reduction, one of the possible options is to manufacture a transmission interface on a chip, which can reduce the induction area. However, although the transmission interface manufactured on the chip has a relatively small induction area, because there are other devices on the same chip and the chip is usually designed to have a high layout density, the operations of these other devices will unavoidably interfere with the transmission interface, and vice versa.

In view of the above, it is important to solve the noise issue in signal transmission by means of electromagnetic induction, to improve the signal transmission stability. Accordingly, to overcome the drawbacks in the prior art, the present invention provides a transmission interface with noise reduction function, which is capable of effectively suppressing interferences from an external magnetic field and interferences to other devices.

SUMMARY OF THE INVENTION

From one perspective, the present invention provides a transmission interface, comprising: a first circuit; and a second circuit; wherein the transmission interface is configured to operably transmit a signal from the first circuit to the second circuit or transmit the signal from the second circuit to the first circuit; wherein the first circuit comprises a first sub-winding unit and a first wire unit which are electrically connected to each other; wherein the second circuit comprises a second sub-winding unit; wherein the first sub-winding unit and the second sub-winding unit are electromagnetically coupled to each other, so that the transmission interface transmits the signal by means of electromagnetic induction between the first sub-winding unit and the second sub-winding unit; wherein: when an electromagnetic noise passes through the first sub-winding unit and the first wire unit, a first sub-winding loop current is generated at the first sub-winding unit, while, a first counter loop current is generated at the first wire unit; wherein a direction of the first sub-winding loop current is opposite to a direction of the first counter loop current, so as to reduce a first net noise current generated at the first circuit caused by the electromagnetic noise; or when an emitting current corresponding to the signal flows through the first circuit, a first forward loop current is generated at the first sub-winding unit and a first forward magnetic field is generated along a first forward direction, whereas, a first backward loop current is generated at the first wire unit and a first backward magnetic field is generated along a first backward direction, the first forward direction being opposite to the first backward direction, so as to reduce a first net electromagnetic interference (EMI) generated at the first circuit caused by the emitting current.

In one embodiment, the first sub-winding unit and the second sub-winding unit are formed on a first integrated circuit in a form of at least one conductive layer.

In one embodiment, the first sub-winding unit and the second sub-winding unit are electromagnetically coupled to each other and each of which includes a circular or a spiral layout.

In one embodiment, a layout plane of the circular or spiral layout of the first sub-winding unit and a layout plane of the circular or spiral layout of the second sub-winding unit are substantially in parallel with an upper surface of a substrate of the first integrated circuit.

In one embodiment, the second circuit further comprises a second wire unit which is electrically connected to the second sub-winding unit; wherein: when the electromagnetic noise passes through the second sub-winding unit and the second wire unit, a second sub-winding loop current is generated at the second sub-winding unit, while, a second counter loop current is generated at the second wire unit; wherein a direction of the second sub-winding loop current is opposite to a direction of the second counter loop current, so as to reduce a second net noise current generated at the second circuit caused by the electromagnetic noise; or when the emitting current corresponding to the signal flows through the second circuit, a second forward loop current is generated at the second sub-winding unit and a second forward magnetic field is generated along a second forward direction, whereas, a second backward loop current is generated at the second wire unit and a second backward magnetic field is generated along a second backward direction, the second forward direction being opposite to the second backward direction, so as to reduce a second net electromagnetic interference (EMI) generated at the second circuit caused by the emitting current.

In one embodiment, the transmission interface comprises at least one of the following features: (1) a first layout formed by the first sub-winding unit and the first wire unit which are electrically connected to each other at least comprises a first cross-over, whereby the direction of the first sub-winding loop current is opposite to the direction of the counter loop current or the first forward direction is opposite to the first backward direction; and/or (2) a second layout formed by the second sub-winding unit and the second wire unit which are electrically connected to each other at least comprises a second cross-over, whereby the direction of the second sub-winding loop current is opposite to the direction of the counter loop current or the second forward direction is opposite to the second backward direction.

In one embodiment, each of the first wire unit and the second wire unit includes a circular or a spiral layout.

In one embodiment, the first wire unit and/or the second wire unit is formed by: (1) one or more bonding wires; or (2) one or more conductive layers on a printed circuit board.

In one embodiment, the first wire unit and the second wire unit are formed by one of the following configurations: (1) the first wire unit and the second wire unit are both formed on the first integrated circuit; (2) the first wire unit and the second wire unit are both formed on a second integrated circuit; (3) the first wire unit is formed on the first integrated circuit, whereas, the second wire unit is formed on the second integrated circuit; or (4) the first wire unit is formed on the second integrated circuit, whereas, the second wire unit is formed on a third integrated circuit; wherein each of the first wire unit and the second wire unit is in a layout plane which is in parallel with the a substrate of the corresponding integrated circuit.

In one embodiment, the first wire unit and the second wire unit are electromagnetically coupled to each other, so that the transmission interface further transmits another signal by means of electromagnetic induction between the first wire unit and the second wire unit.

In one embodiment, the first sub-winding unit and the first wire unit are connected in series, while, the second sub-winding unit and the second wire unit are connected in series.

In one embodiment: (1) the first wire unit and the second wire unit are both formed on the first integrated circuit; or (2) the first wire unit and the second wire unit are both formed on a second integrated circuit; wherein each of the first wire unit and the second wire unit includes a circular or a spiral layout; and wherein a layout plane of the circular or spiral layout of the first sub-winding unit and a layout plane of the circular or spiral layout of the second sub-winding unit are substantially in parallel with an upper surface of a substrate of the corresponding integrated circuit.

In one embodiment, the first integrated circuit includes an operation circuit having at least one operation device, at least apart of the at least one operation device is formed below an upper surface of a substrate of the first integrated circuit.

In one embodiment, the transmission interface is applied to a flyback power converter circuit; and wherein the transmission interface is configured to operably transmit the signal between a primary side and a secondary side of the flyback power converter circuit.

In one embodiment, the transmission interface is configured to operably synchronize switching operations between a primary side power switch and a secondary side synchronization switch of the flyback power converter circuit.

In one embodiment, the transmission interface is applied to a flyback power converter circuit; and wherein the first integrated circuit includes a primary side control circuit or a secondary side control circuit of the flyback power converter circuit.

In one embodiment, the first sub-winding unit, the first wire unit, the second sub-winding unit and the second wire unit are in a same conductive layer at a same level, or at least two of the first sub-winding unit, the first wire unit, the second sub-winding unit and the second wire unit are in different conductive layers at different levels.

In one embodiment: (1) an equivalent induction area enclosed by the first sub-winding unit is approximately equal to an equivalent induction area enclosed by the first wire unit, so that the first net noise current or the first net electromagnetic interference (EMI) is approximately equal to zero; and/or (2) an equivalent induction area enclosed by the second sub-winding unit is approximately equal to an equivalent induction area enclosed by the second wire unit, so that the second net noise current or the second net electromagnetic interference (EMI) is approximately equal to zero.

In one embodiment, the first integrated circuit and a third integrated circuit are stacked one on the other to integrated into an integrated circuit package.

In one embodiment, the transmission interface is applied to a flyback power converter circuit; and wherein the third integrated circuit includes a primary side control circuit or a secondary side control circuit of the flyback power converter circuit.

In one embodiment, a current flowing through the first circuit does not directly flow to the second circuit; or wherein a current flowing through the second circuit does not directly flow to the first circuit.

In one embodiment, at least part of the induction area of the first wire unit and part of the induction area of the second wire unit overlap with each other, so that an electromagnetic coupling interaction is achieved between the first wire unit and the second wire unit; and/or at least part of the induction area of the first sub-winding unit and part of the induction area of the second sub-winding unit overlap with each other, so that an electromagnetic coupling interaction is achieved between the first sub-winding unit and the second sub-winding unit.

In one embodiment, the first circuit and the second circuit form a transformer; and wherein the first circuit and the second circuit include a winding and another winding of the transformer, respectively.

The objectives, technical details, features, and effects of the present invention will be better understood with regard to the detailed description of the embodiments below.

DESCRIPTION OF THE PREFERRED EMBODIMENTS

Figure 1A:
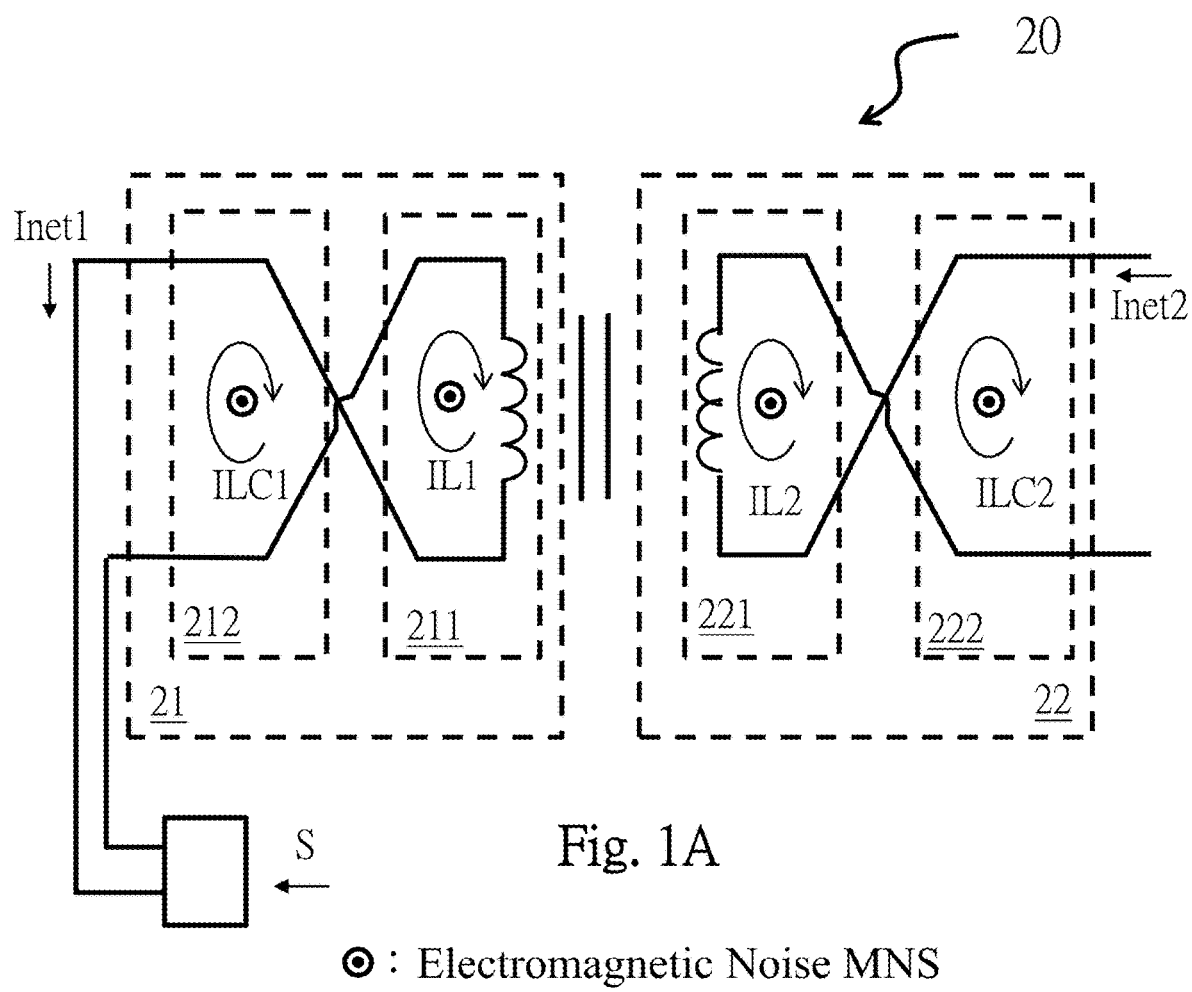
FIGS. 1A, 1B and 1C show schematic diagrams of a transmission interface according to several different embodiments of the present invention, respectively.

The above and other technical details, features and effects of the present invention will be better understood with regard to the detailed description of the embodiments below, with reference to the drawings. In the description, the words relate to directions such as "upper", "lower", "left", "right", "forward", "backward", etc. are used to illustrate relative orientations in the drawings and should not be considered as limiting in any way. The drawings as referred to throughout the description of the present invention are for illustration only, to show the interrelations between the apparatus and the devices, but not drawn according to actual scale.

Please refer to FIG. 1A, which shows a schematic diagram of a transmission interface (i.e. transmission interface 20) according to an embodiment of the present invention. The transmission interface 20 comprises a first circuit 21 and a second circuit 22. The transmission interface 20 is configured to operably transmit a signal S from the first circuit 21 to the second circuit 22. The first circuit 21 comprises a first sub-winding unit 211 and a first wire unit 212 which are electrically connected to each other. The second circuit 22 comprises a second sub-winding unit 221. The first sub-winding unit 211 and the second sub-winding unit 221 are electromagnetically coupled to each other, so that the transmission interface 20 can transmit the signal S to the second circuit 22 through the electromagnetic induction between the first sub-winding unit 211 and the second sub-winding unit 221.

Figure 1B:
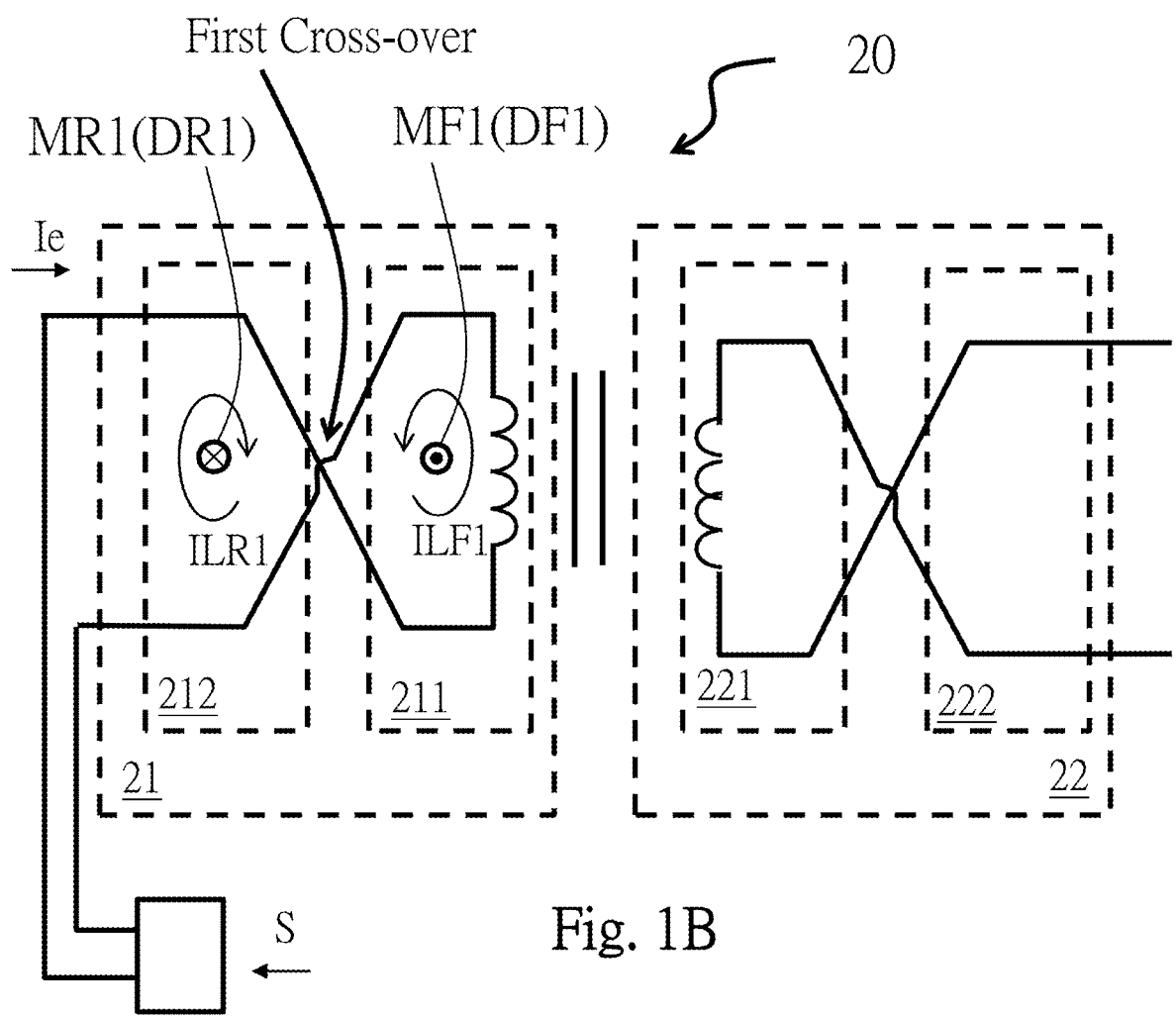

When an electromagnetic noise MNS (the electromagnetic noise MNS has an outward direction which is perpendicular to the plane of the drawing sheet of FIG. 1A) passes through the first sub-winding unit 211 and the first wire unit 212, a first sub-winding loop current IL1 is generated at the first sub-winding unit 211, while, a first counter loop current ILC1 is generated at the first wire unit 212, wherein a direction of the first sub-winding loop current IL1 is opposite to a direction of the first counter loop current ILC1. That the directions are "opposite to" each other means that: for example as shown in FIG. 1A, the directions of the first sub-winding loop current IL1 and the first counter loop current ILC1 are both clockwise direction, but the direction of the first sub-winding loop current IL1 is opposite to the direction of the first counter loop current ILC1 at a cross-over circuit area (for example referring to the "first cross-over" in FIG. 1B), whereby the noise is reduced. Or, in an alternative case, the directions of the first sub-winding loop current IL1 and the first counter loop current ILC1 are both counterclockwise direction (as shown in FIG. 1B), but the direction of the first sub-winding loop current IL1 is opposite to the direction of the first counter loop current ILC1 at a cross-over circuit area, whereby the noise is reduced. Thus, a first net noise current Inet1 generated at the first circuit 21 caused by the electromagnetic noise MNS is reduced. The "first net noise current Inet1" indicates a net current which is equal to a difference between the first sub-winding loop current IL1 and the first counter loop current ILC1; in one embodiment, preferably, the first net noise current Inet1 is equal to zero or approximately equal to zero.

Or, in an alternative case, referring to FIG. 1B, when an emitting current Ie corresponding to the signal S flows through the first circuit 21, a first forward loop current ILF1 is generated at the first sub-winding unit 211 and a first forward magnetic field MF1 (generated by the first forward loop current ILF1 according to Ampère's right-hand grip rule) is generated along a first forward direction DF1 (the first forward direction DF1 has an outward direction which is perpendicular to the plane of the drawing sheet of FIG. 1B), while, a first backward loop current ILC1 is generated at the first wire unit 212 and a first backward magnetic field MR1 (generated by the first backward loop current ILC1 according to Ampère's right-hand grip rule) is generated along a first backward direction DR1 (the first forward direction DF1 has an inward direction which is perpendicular to the plane of the drawing sheet of FIG. 1B). The first forward direction DF1 is substantially opposite to the first backward direction DR1, so as to reduce a first net electromagnetic interference (EMI) generated at the first circuit 21 caused by the emitting current Ie. That is, the first forward magnetic field MF1 and the first backward magnetic field MR1 can cancel each other, so as to reduce the electromagnetic interference (EMI). The term "first net electromagnetic interference" refers to a net electromagnetic field which is equal to a difference between the first forward magnetic field MF1 and the first backward magnetic field MR1.

In the above-mentioned embodiment, the first circuit 21 is the signal emitting side of the signal S and the second circuit 22 is the signal receiving side of the signal S. However in other embodiments, depending upon practical needs, it is also practicable and within the scope of the present invention that the transmission interface 20 can be a bidirectional transmission interface capable of emitting and receiving signals, that is, either one of the first circuit 21 and the second circuit 22 can be the signal emitting side of the signal S and the other can be the signal receiving side of the signal S. The same mechanism applied to the above-mentioned embodiment can be applied to the bidirectional transmission interface to achieve substantially the same advantages and efficacies.

Figure 2A:
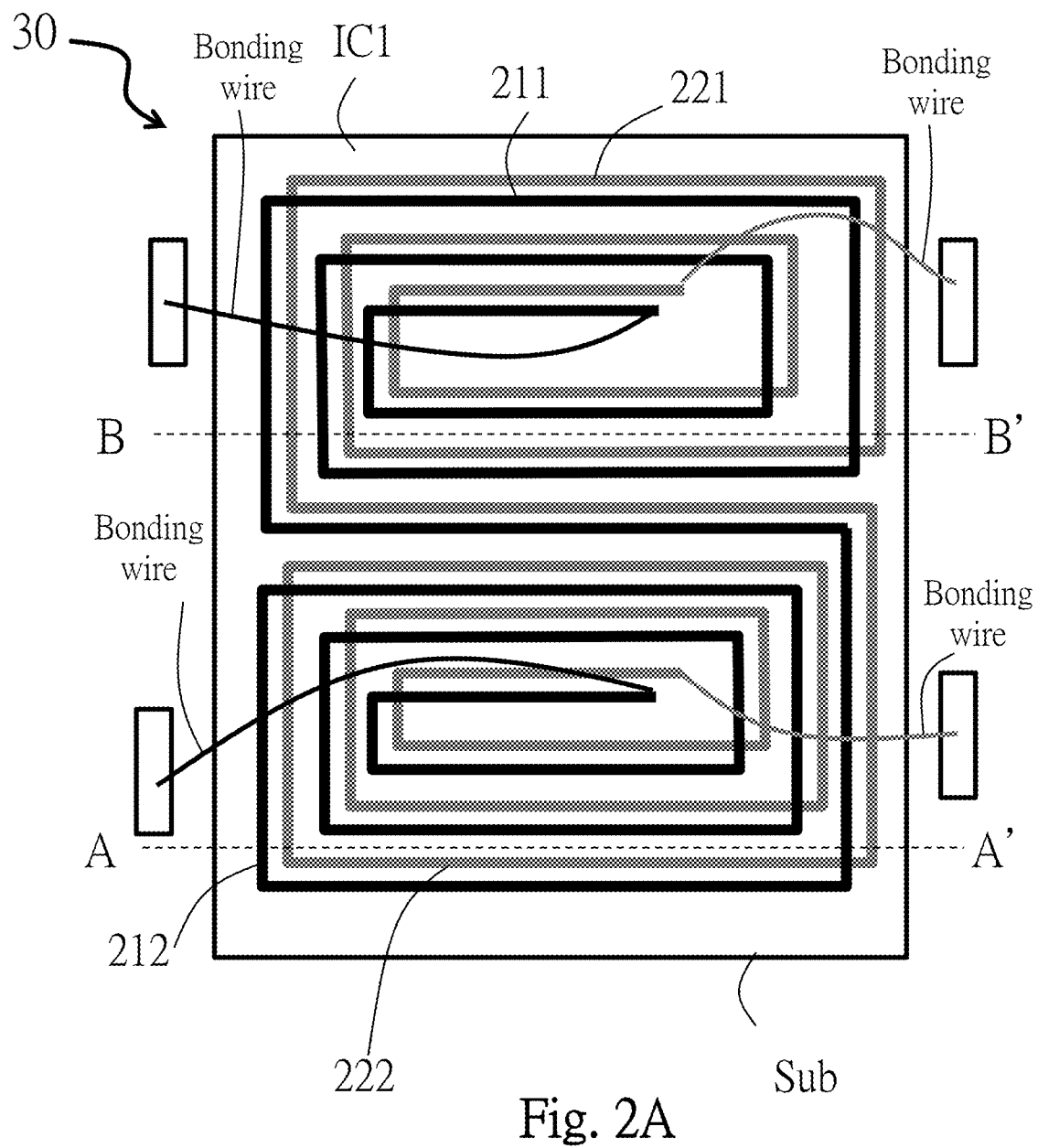
FIG. 2A shows a schematic diagram illustrating a layout pattern of a transmission interface according to the present invention.
Figure 2B:
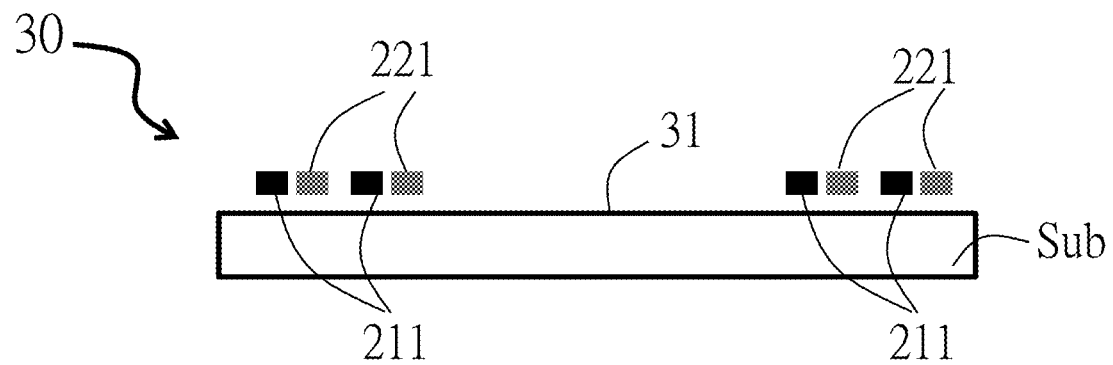
FIGS. 2B-2C show cross-cross-section views of FIG. 2A, taken along cross-section lines A-A' and B-B'.
Figure 2C:
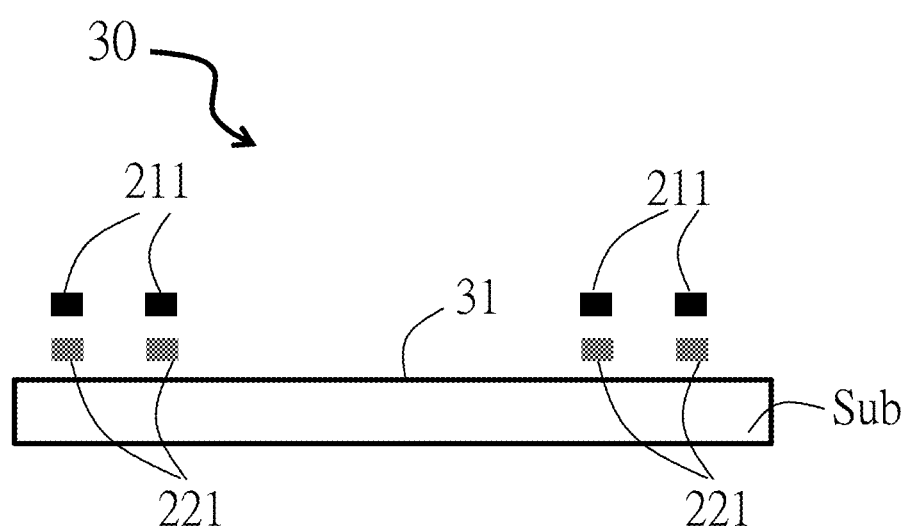

FIGS. 2A-2C shows schematic diagrams illustrating layout patterns of a transmission interface (i.e. transmission interface 30) according to an embodiment of the present invention. FIGS. 2B-2C show cross-cross-section view of FIG. 2A taken along cross-section lines A-A' and B-B'. The first sub-winding unit 211 and the second sub-winding unit 221 are formed on a first integrated circuit IC1 in the form of at least one conductive layer. The conductive layer for example can be formed by a metal, conductor or semiconductor as a layer (or more than one layer) in an integrated circuit manufacturing process. The formation of the first sub-winding unit 211 and the second sub-winding unit 221 on the first integrated circuit IC1 can be implemented in various ways. For example, the first sub-winding unit 211 and the second sub-winding unit 221 can be a same conductive layer at a same level (as shown in FIG. 2B). For another example, the first sub-winding unit 211 and the second sub-winding unit 221 can be different conductive layers at different levels (as shown in FIG. 2C). In the embodiment where the first sub-winding unit 211 and the second sub-winding unit 221 are different conductive layers at different levels (as shown in FIG. 2C), the spatial relationship between the first sub-winding unit 211 and the second sub-winding unit 221 is not limited to the figure shown. In one embodiment, one of the first sub-winding unit 211 and the second sub-winding unit 221 is located right above the other (as shown in FIG. 2C). Under such circumstance, FIG. 2A can be regarded as a perspective view with a tilt angle, whereby the second sub-winding unit 221 can be shown in FIG. 2C.

Figure 4:
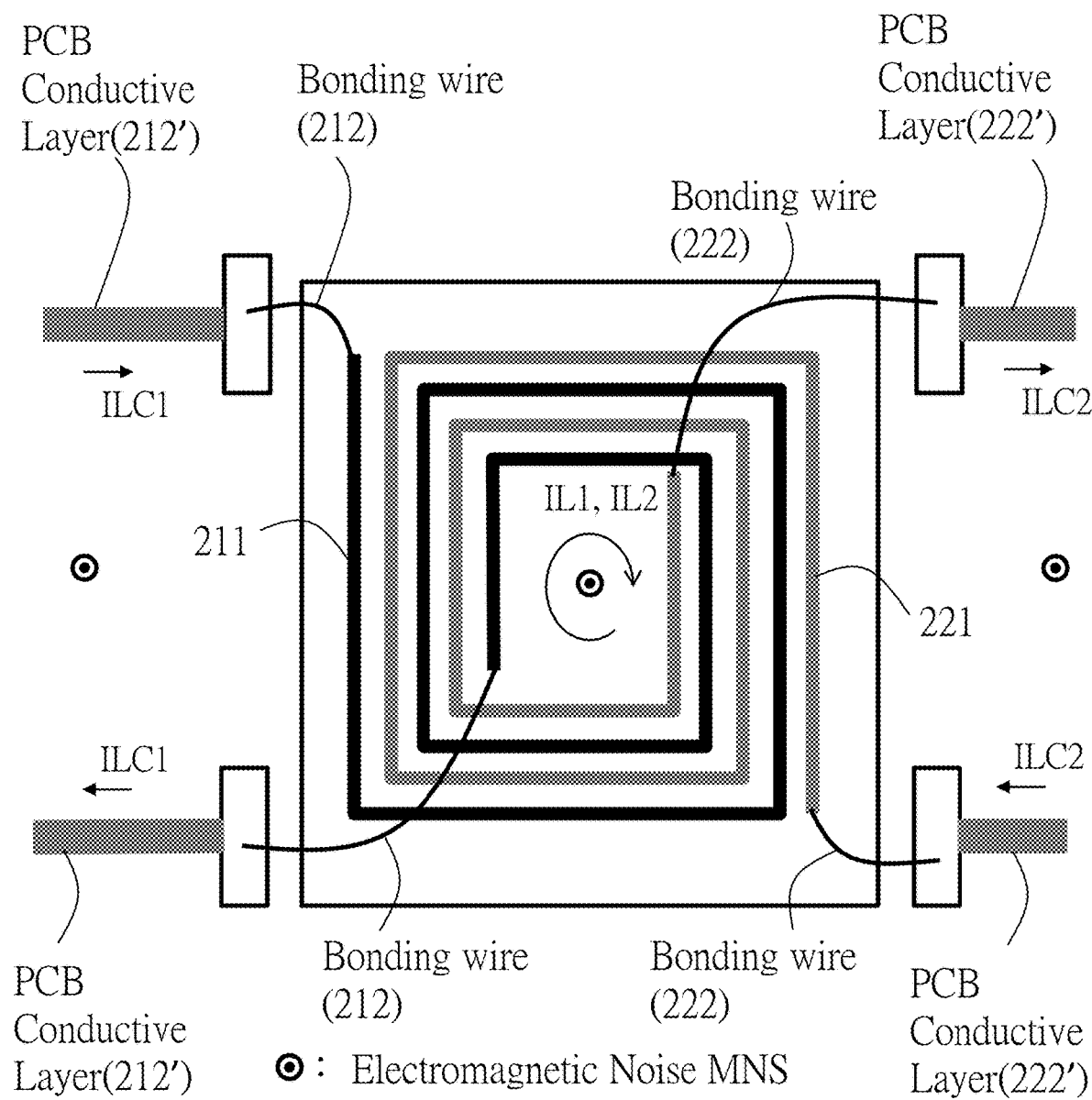
FIGS. 4-6 show schematic diagrams illustrating layout patterns of a transmission interface according to several different embodiments of the present invention, respectively.
Figure 5:
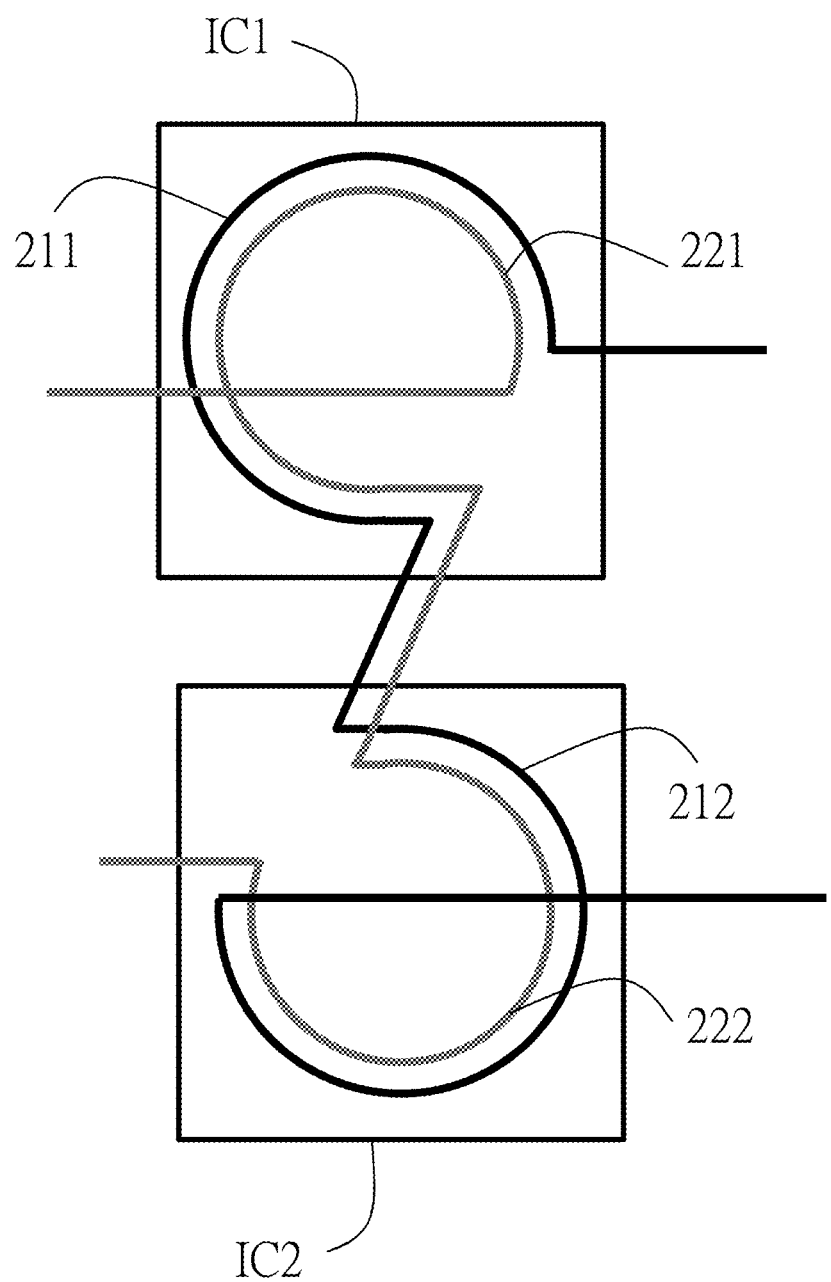
Figure 6:
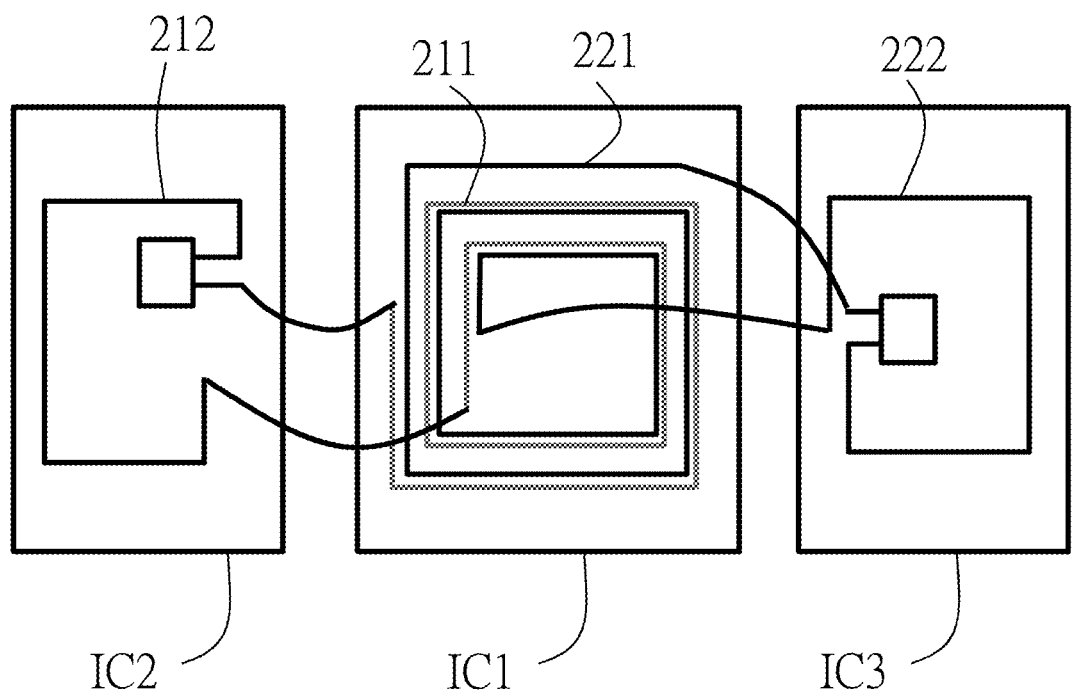

As shown in FIG. 2A, in one embodiment, the first wire unit 212 and the second wire unit 222 are electromagnetically coupled to each other in a way similar to the relationship between the first sub-winding unit 211 and the second sub-winding unit 221. In the present invention, depending upon the practical requirements, the first wire unit 212 and the second wire unit 222 can be arranged not to be electromagnetically coupled to each other (as shown in the embodiments of FIG. 4 and FIG. 6) or can be arranged to be electromagnetically coupled to each other (as shown in the embodiments of FIGS. 2A, 5, 8 and 9), as required by the application.

Figure 7A:
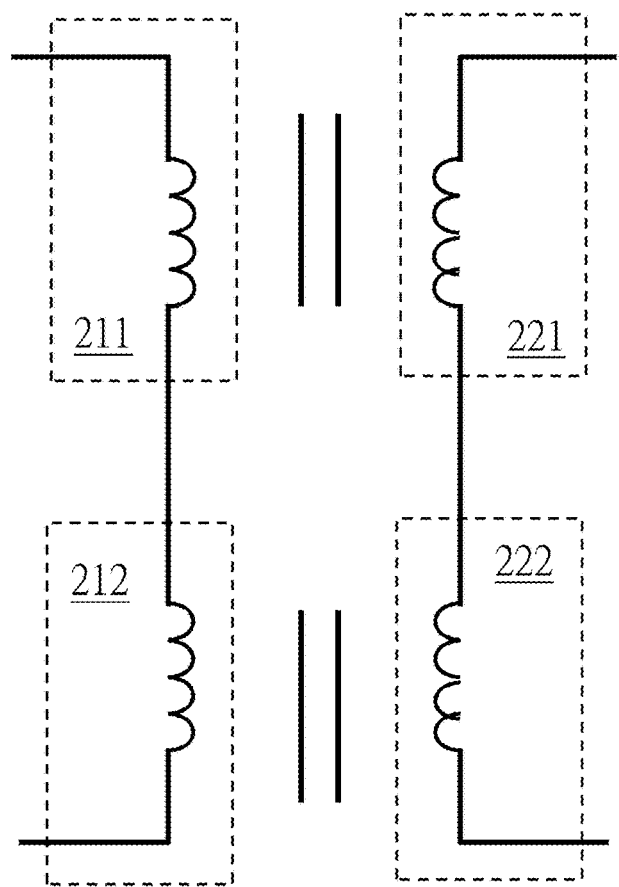
FIGS. 7A and 7B show schematic diagrams of a transmission interface according to several different embodiments of the present invention, respectively.
Figure 7B:
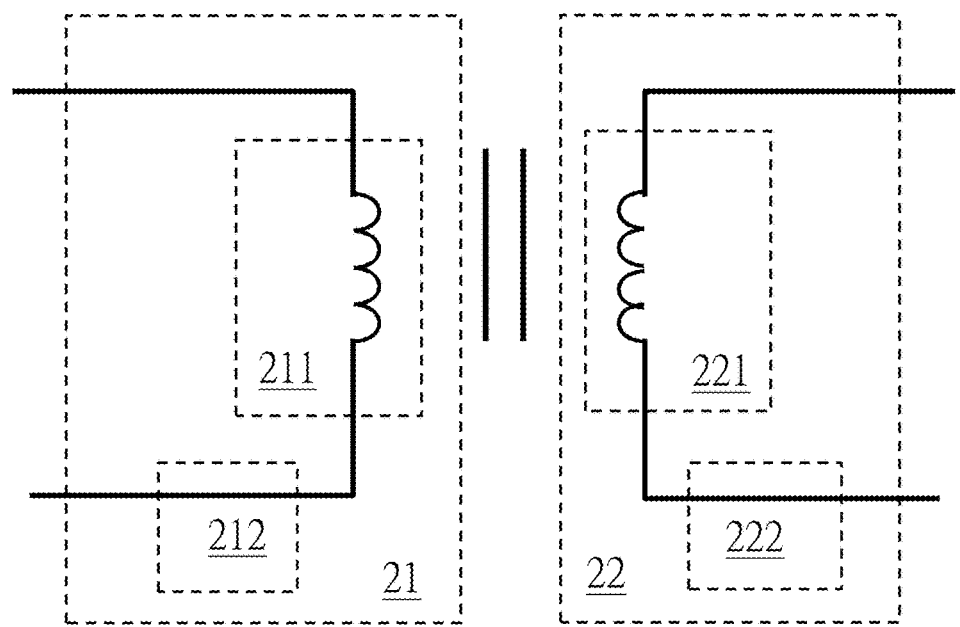

Please refer to FIGS. 2A-2C in conjugation with FIGS. 7A and 7B. FIG. 7A shows an equivalent circuit of an embodiment of the present invention wherein the first wire unit 212 and the second wire unit 222 are electromagnetically coupled to each other. FIG. 7B shows an equivalent circuit of an embodiment of the present invention wherein the first wire unit 212 and the second wire unit 222 are not electromagnetically coupled to each other. In the embodiments wherein the first wire unit 212 and the second wire unit 222 are electromagnetically coupled to each other (e.g., as shown in FIGS. 2A, 5, 7A and 8), because the transmission interface 20 can transmit the signal S by means of electromagnetic induction between the first wire unit 212 and the second wire unit 222, a relatively higher electromagnetic coupling efficiency can be achieved in these embodiments corresponding to FIGS. 2A, 5, 7A and 8.

In the above-mentioned embodiment, the first sub-winding unit 211 and the first wire unit 212 are connected in series with each other, while, the second sub-winding unit 221 and the second wire unit 222 are connected in series with each other. However, it should be understood that such arrangement in the above-mentioned preferred embodiment is only an illustrative example, but not for limiting the scope of the present invention. The electrical connection between the sub-winding unit and the wire unit can be any arrangement, such as in parallel, as long as they can transmit the signal as desired. Those skilled in this art can readily conceive variations and modifications within the spirit of the present invention.

In one embodiment, as shown in FIGS. 7A and 7B, the first circuit 21 and the second circuit 22 together form a transformer, wherein the first circuit 21 forms one winding of the transformer and the second circuit 22 forms another winding of the transformer.

In one embodiment, the layout of the first sub-winding unit 211 and the second sub-winding unit 221 which are electromagnetically coupled to each other can be in a circular form (as shown in FIGS. 1A, 1B, 1C, 3A and 3B), or in a spiral form (as shown by the planar spiral form in FIG. 2A, or a 3D screw-type spiral form). Please refer to FIGS. 2B-2C, wherein FIGS. 2B-2C are cross-section views of FIG. 2A taken along the cross-section line B-B' in FIG. 2A. In this embodiment, the first sub-winding unit 211 and the second sub-winding unit 221 which have a layout in the circular form or the planar spiral form extend in a plane which is substantially in parallel with a substrate Sub of the first integrated circuit IC1. That is, the layout plane of the first sub-winding unit 211 and the second sub-winding unit 221 is substantially in parallel with an upper surface 31 of the substrate Sub of the first integrated circuit IC1. Note that, the term "substantially in parallel with", as may be used herein, is meant to include a situation wherein, when the first sub-winding unit 211 and the second sub-winding unit 221 form a circular or planar spiral layout by more than one conductive layer, although the multi-layer layout is not entirely in parallel with the substrate Sub of the first integrated circuit IC1, because the scale of the level difference between the layers in the integrated circuit is relatively small as compared to the scale of the length and width of the integrated circuit, it can still be regarded as "substantially in parallel with".

In the above-mentioned embodiment, regardless whether the first sub-winding unit 211 and the second sub-winding unit 221 form a circular layout or a planar spiral layout, the layout of the first sub-winding unit 211 and the layout of the second sub-winding unit 221 can be arranged to have opposite rotation directions with respect to each other. Please refer to FIGS. 3A and 3B, which are illustrative examples showing possible layouts to generate the first sub-winding loop current IL1 and the first counter loop current ILC1 having opposite rotation directions with respect to each other, wherein the layout is in a rounded-edge circular form in FIG. 3A and in a sharp-edge circular form in FIG. 3B. Or, from another perspective, when the emitting current Ie flows through the first circuit 21, the generated magnetic fields cancel each other (as shown by the magnetic field generated along the first forward direction DF1 and the magnetic field generated along the first backward direction DR1).

In addition to the first circuit 21, the second circuit 22 also can be arranged to operate according to substantially the same mechanism as the first circuit 21. As shown in FIG. 1A, in one embodiment, the second circuit 22 can further comprise a second wire unit 222 which is electrically connected to the second sub-winding unit 221. When the electromagnetic noise MNS passes through the second sub-winding unit 221 and the second wire unit 222, a second sub-winding loop current IL2 is generated at the second sub-winding unit 221, while, a second counter loop current ILC2 is generated at the second wire unit 222. The direction of the second sub-winding loop current IL2 is opposite to the direction of the second counter loop current ILC2, so that they cancel each other to reduce a second net noise current Inet2 generated at the second circuit 22 caused by the electromagnetic noise MNS. The term "second net noise current Inet2" refers to a net noise current which is equal to a difference between the second sub-winding loop current IL2 and the second counter loop current ILC2. In one embodiment, preferably, the second net noise current Inet2 is equal to zero or approximately equal to zero.

Figure 1C:
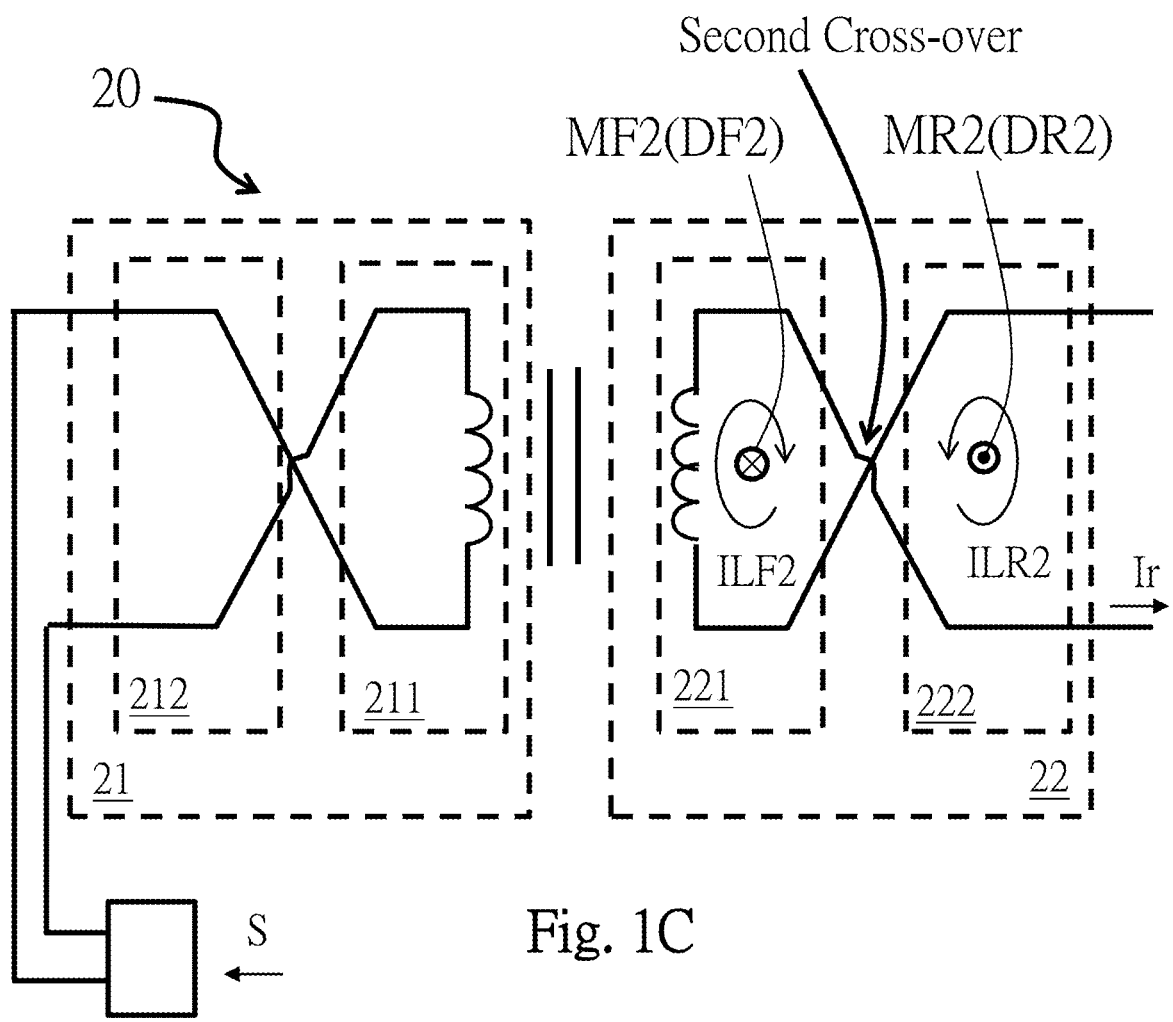

Or, in an alternative case, referring to FIG. 1C, when a received current Ir corresponding to the signal S flows through the second circuit 22, a second forward loop current ILF2 is generated at the second sub-winding unit 221 and a second forward magnetic field MF2 (generated by the second forward loop current ILF2 according to Ampère's right-hand grip rule) is generated along a second forward direction DF2 (the second forward direction DF2 has an inward direction which is perpendicular to the plane of the drawing sheet of FIG. 1C). Moreover, when the received current Ir corresponding to the signal S flows through the second circuit 22, a second backward loop current ILC2 is generated at the second wire unit 222 and a second backward magnetic field MR2 (generated by the second backward loop current ILC2 according to Ampère's right-hand grip rule) is generated along a second backward direction DR2 (the second backward direction DR2 has an outward direction which is perpendicular to the plane of the drawing sheet of FIG. 1C). The second forward direction DF2 is opposite to the second backward direction DR2, so as to reduce a second net electromagnetic interference (EMI) generated at the second circuit 22 caused by the received current Ir. That is, the second forward magnetic field MF2 and the second backward magnetic field MR2 cancel each other, to reduce the electromagnetic interference (EMI). The "second net electromagnetic interference" refers to a net electromagnetic field which is equal to a difference between the second forward magnetic field MF2 and the second backward magnetic field MR2.

Figure 3A:
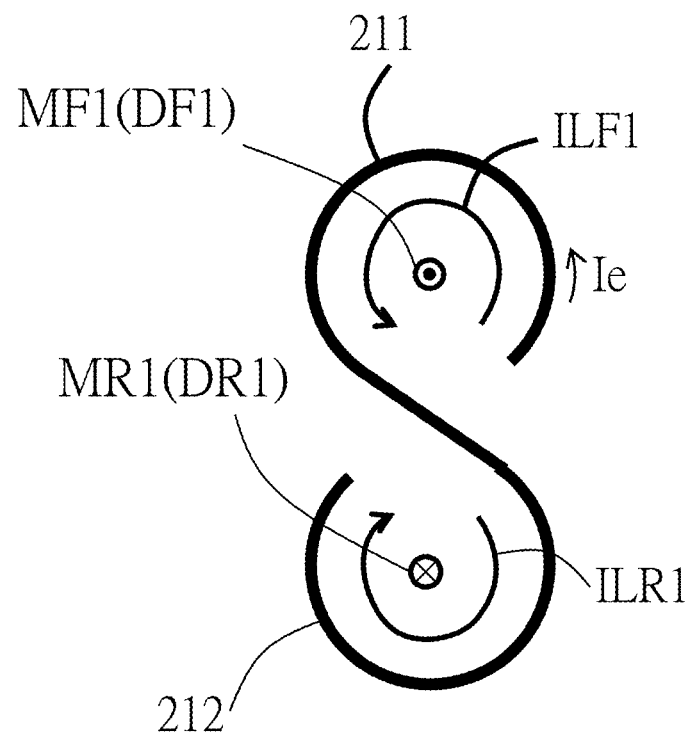
FIGS. 3A and 3B show two embodiments of a first circuit of the present invention.
Figure 3B:
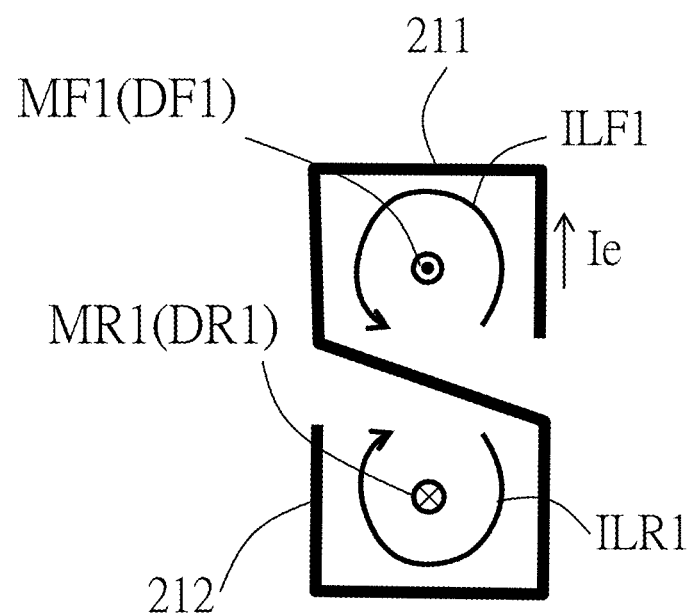

The first wire unit 212 and the second wire unit 222 in the above-mentioned embodiment can have a layout in a rounded-edge circular form as shown in FIG. 3A or in a sharp-edge circular form as shown in FIG. 3B.

In one embodiment, the above-mentioned transmission interface 20 can further comprise at least one of the following features:
(1) that an equivalent induction area enclosed by the first sub-winding unit 211 is approximately equal to an equivalent induction area enclosed by the first wire unit 212, so that the first net noise current Inet1 or the first net electromagnetic interference (EMI) is approximately equal to zero; this means that the magnetic fluxes converted by the induction magnetic fields of the first sub-winding unit 211 and the first wire unit 212 are substantially the same; and/or
(2) that an equivalent induction area enclosed by the second sub-winding unit 221 is approximately equal to an equivalent induction area enclosed by the second wire unit 222, so that the second net noise current Inet2 or the second net electromagnetic interference (EMI) is approximately equal to zero; this means that the magnetic fluxes converted by the induction magnetic fields of the second sub-winding unit 221 and the second wire unit 222 are substantially the same.

In one embodiment, the above-mentioned transmission interface 20 can comprise at least one of the following features:
(1) a first layout formed by the first sub-winding unit 211 and the first wire unit 212 which are electrically connected to each other at least comprises a first cross-over (as shown in FIG. 1B), whereby the direction of the first sub-winding loop current IL1 is opposite to the direction of the counter loop current ILC1 or the first forward direction DF1 is opposite to the first backward direction DR1; and/or
(2) a second layout formed by the second sub-winding unit 221 and the second wire unit 222 which are electrically connected to each other at least comprises a second cross-over (as shown in FIG. 1C), whereby the direction of the second sub-winding loop current IL2 is opposite to the direction of the counter loop current ILC2 or the second forward direction DF2 is opposite to the second backward direction DR2. The opposite arrangement of the directions causes the above-mentioned forward/backward loop currents or forward/backward magnetic fields to cancel each other, so as to reduce noise generated at the transmission interface 20.

In the embodiments of FIGS. 1A, 1B, 1C and 2, each of the first wire unit 212 and the second wire unit 222 at least includes apart thereof which form a circular layout or a spiral layout (e.g., a planar spiral layout as shown by FIG. 2A or a 3D screw-type spiral layout). The rotation direction of the circular layout or the spiral layout is not limited to the figure shown. In another embodiment, the rotation direction can be arranged otherwise, such as in an opposite way or in a mirror form.

In the embodiment of FIG. 4, the transmission interface 20 can include bonding wires. The bonding wires can be regarded as the first wire unit 212 and the second wire unit 222, or as part of the first wire unit 212 and the second wire unit 222. In another embodiment, it can be arranged such that only one of the first wire unit 212 and the second wire unit 222 is formed by the bonding wires. In another embodiment, as shown in FIGS. 1A-1C, at least one of the first wire unit 212 and the second wire unit 222 is formed by a conductive layer on a printed circuit board. For example, as shown in FIG. 4, in one embodiment, the first wire unit 212 includes bonding wires plus wirings 212' formed by the conductive layer on a printed circuit board. In one embodiment, as shown in FIG. 4, the second wire unit 222 includes bonding wires plus wirings 222' formed by the conductive layer on a printed circuit board. Note that, in the embodiment of FIG. 4, even though the first wire unit 212 and the second wire unit 222 are formed by bonding wires which by themselves are discontinuous or a conductive layer on a printed circuit board which by itself is discontinuous, these discontinuous bonding wires or discontinuous conductive layer can still generate the first counter loop current ILC1 (or, the first backward loop current ILR1) and the second counter loop current ILC2 (or, the second backward loop current ILR2). Accordingly, the first wire unit 212 and the second wire unit 222 formed by these discontinuous bonding wires or discontinuous conductive layer can still be regarded as, equivalently, being in a circular or spiral layout form.

In one embodiment, the first sub-winding unit 211, the first wire unit 212, the second sub-winding unit 221 and the second wire unit 222 can be formed by a same conductive layer. However, depending upon practical needs, for example if it is desired to reduce the area required by the electromagnetic induction, the first sub-winding unit 211 and the second sub-winding unit 221 can be formed by different conductive layers (at different levels). That is, in another embodiment, two or more of the first sub-winding unit 211, the first wire unit 212, the second sub-winding unit 221 and the second wire unit 222 are formed by different conductive layers. In one embodiment, the first sub-winding unit 211, the first wire unit 212, the second sub-winding unit 221 and the second wire unit 222 are formed by respective different conductive layers. Note that, regardless whether the first wire unit 212 and the second wire unit 222 as illustrated in FIGS. 2B and 2C are formed by semiconductor layers in an integrated circuit or conductive layers on a printed circuit board, the advantageous effect provided by the present invention is unchanged.

In one embodiment, the first wire unit 212 and the second wire unit 222 can be formed by one of the following configurations: (1) the first wire unit 212 and the second wire unit 222 are both formed on the first integrated circuit IC1 (as shown in FIG. 2A); (2) the first wire unit 212 and the second wire unit 222 are both formed on a second integrated circuit IC2 (as shown in FIG. 5, note that the first wire unit 212 and the second wire unit 222 are both formed on a second integrated circuit IC2 instead of the first integrated circuit IC1); (3) the first wire unit 212 is formed on the first integrated circuit IC1, whereas, the second wire unit 222 is formed on the second integrated circuit IC2 (this configuration is a variation of configuration (1), namely, the second wire unit 222 is not formed on the first integrated circuit IC1 but is formed on the second integrated circuit IC2); or (4) referring to FIG. 6, the first wire unit 212 is formed on the second integrated circuit IC2, whereas, the second wire unit 222 is formed on a third integrated circuit IC3. In the above-mentioned different respective configurations, the first wire unit 212 and the second wire unit 222 are in a layer which is parallel with the substrate of a corresponding integrated circuit (i.e., the integrated circuit where the first wire unit 212 or the second wire unit 222 can be formed on).

In one embodiment, the transmission interface has one of the following features: (1) the first wire unit 212 and the second wire unit 222 are both formed on the first integrated circuit IC1 (as shown in FIG. 2A); (2) the first wire unit 212 and the second wire unit 222 are both formed on a second integrated circuit IC2 (as shown in FIG. 5). The first wire unit 212 and the second wire unit 222 which are electromagnetically coupled to each other form a circular layout (as shown in FIG. 5) or a spiral layout (as shown by the planar spiral layout in FIG. 2A). In the above-mentioned embodiments, the first wire unit 212 and the second wire unit 222 which have a layout in the circular form or the planar spiral form extend in a plane which is substantially in parallel with a substrate Sub of the first integrated circuit IC1. That is, the layout plane of the first wire unit 212 and the second wire unit 222 is substantially in parallel with an upper surface of the substrate Sub of the first integrated circuit IC1.

In one embodiment, the above-mentioned transmission interface 20 can further comprise one of the following features: at least part of the induction area of the first wire unit 212 and part of the induction area of the second wire unit 222 overlap with each other, so that an electromagnetic coupling interaction is achieved between the first wire unit 212 and the second wire unit 222; and/or at least part of the induction area of the first sub-winding unit 211 and part of the induction area of the second sub-winding unit 221 overlap with each other, so that an electromagnetic coupling interaction is achieved between the first sub-winding unit 211 and the second sub-winding unit 221.

Figure 8:
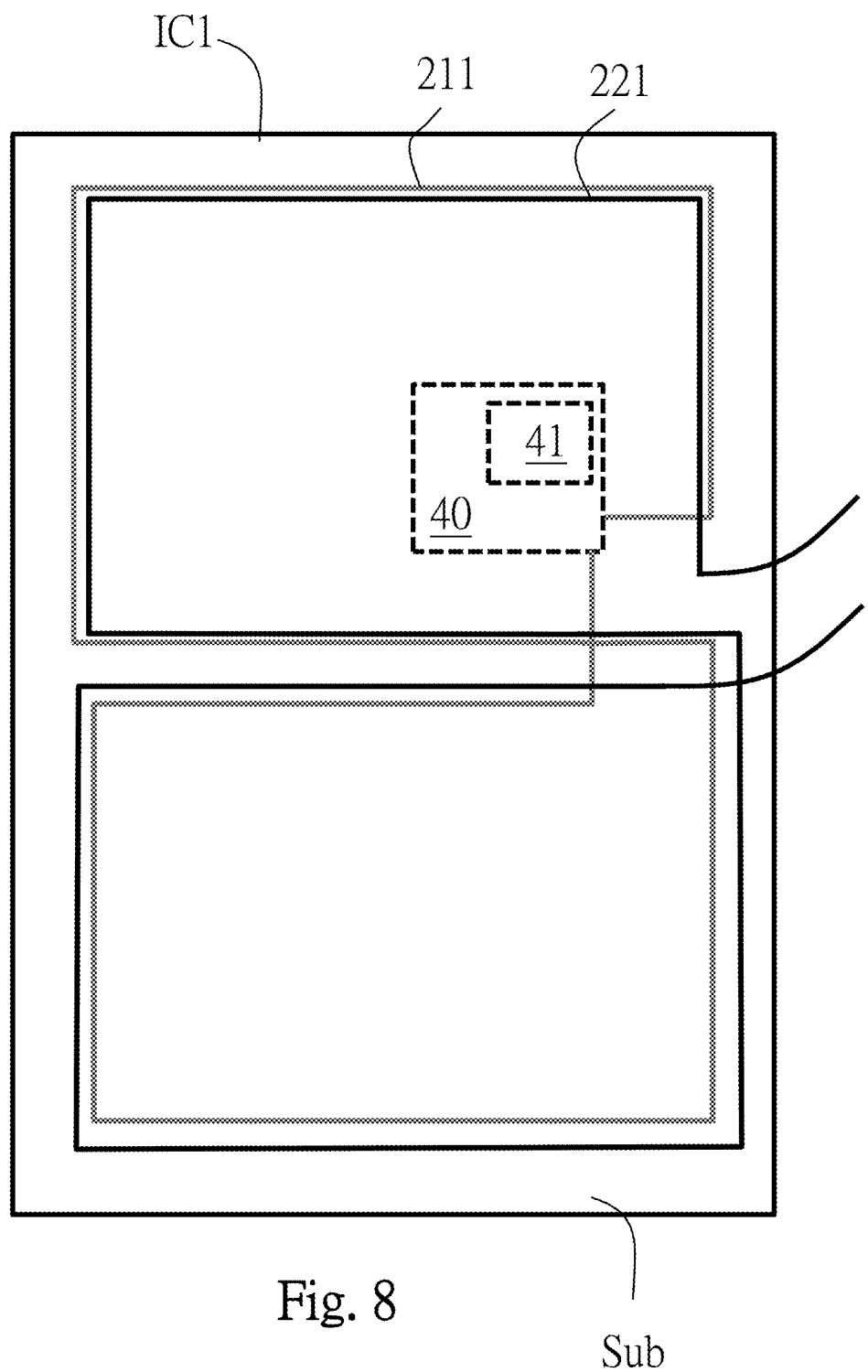
FIGS. 8-9 show schematic diagrams illustrating layout patterns of a transmission interface according to several different embodiments of the present invention, respectively.

Please refer to FIG. 8. In one embodiment, the first integrated circuit IC1 includes an operation circuit 40 having an operation device 41. At least part of the operation device 41 is formed below an upper surface of the substrate Sub of the first integrated circuit IC1. In one embodiment, the operation circuit 40 can be, for example but not limited to, a logic gate, an analog circuit or a flyback power converter circuit. In one embodiment, the operation device 41 can be, for example but not limited to, an active device such as a transistor or a passive device such as a capacitor. In one embodiment, the at least part of the operation device 41 can be, for example but not limited to, a source, a drain or a body region of a transistor. In other words, the transmission interface according to the present invention can be integrated with one or more other circuits having other functions in one same substrate of the integrated circuit. Moreover, in one embodiment, as shown in FIG. 8, the operation circuit 40 is coupled to the first circuit 21 or the second circuit 22. In yet another embodiment, the operation circuit 40 is not coupled to the first circuit 21 and the second circuit 22.

Figure 9:
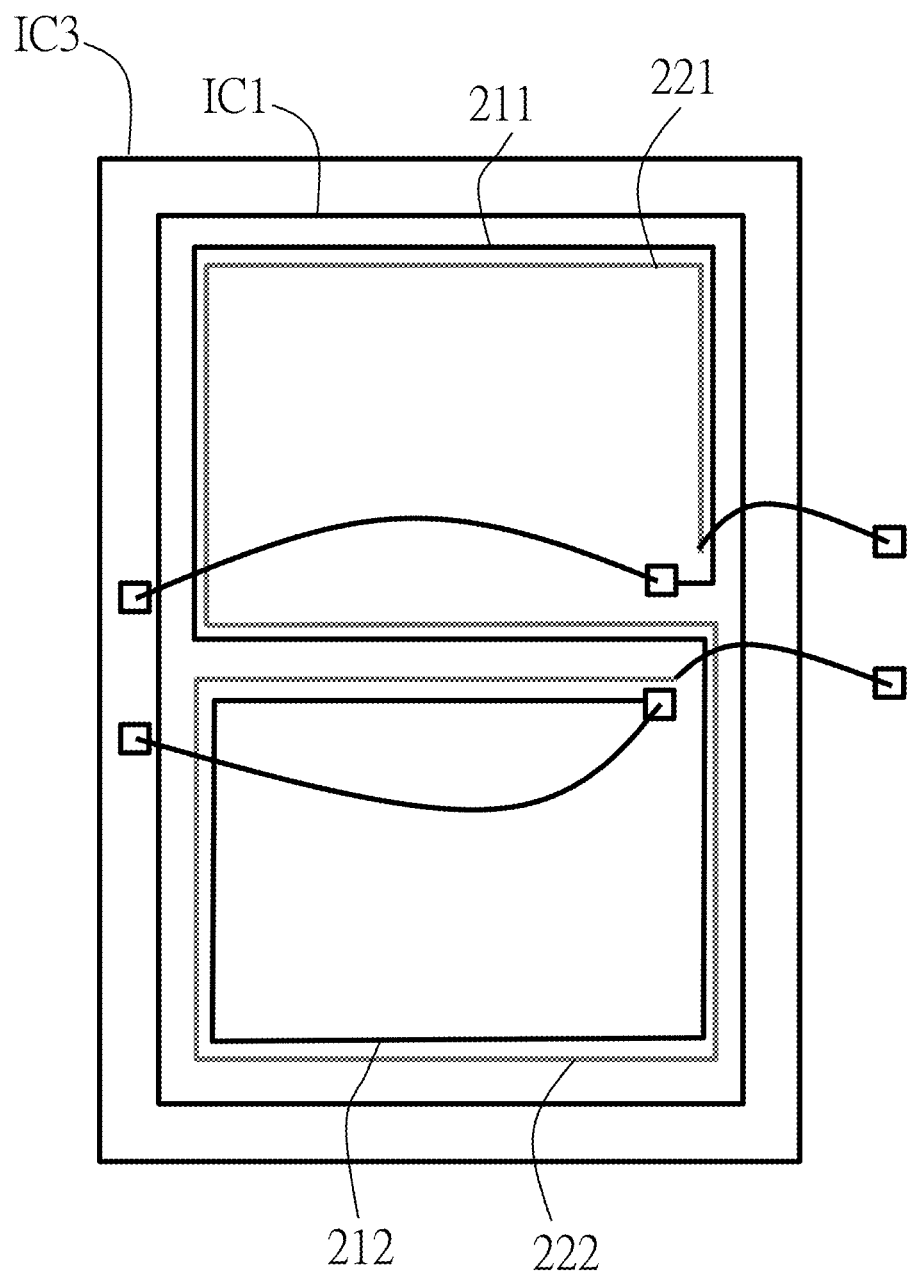

Please refer to FIG. 9. In one embodiment, the first integrated circuit IC1 including the first sub-winding unit 211, the first wire unit 212, the second sub-winding unit 221, the second wire unit 222 can be stacked above the third integrated circuit IC3. In one embodiment, the first integrated circuit IC1 and the third integrated circuit IC3 can be integrated into one integrated circuit package.

Figure 10:
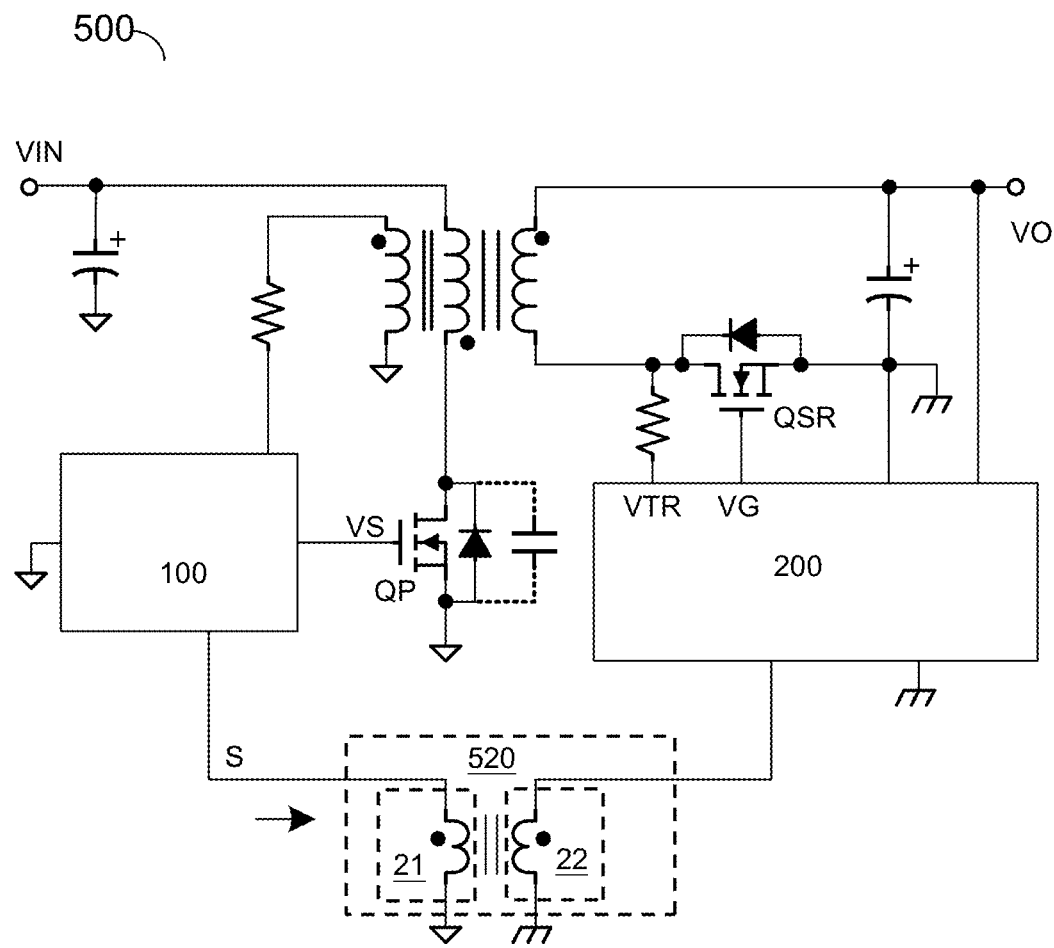
FIG. 10 shows a schematic diagram of a transmission interface which is applied to a flyback power converter circuit.

Please refer to FIG. 10. The transmission interface 20 of the present invention can be applied to a flyback power converter circuit 500 (as shown in FIG. 10). In this embodiment, the transmission interface 20 of the present invention corresponds to a pulse transformer 520 shown in FIG. 10, which is configured to operably transmit a signal between a primary side and a secondary side (coupled to the first circuit 21 and the second circuit 22, respectively) of the flyback power converter circuit 500. In one embodiment, the transmission interface 20 (corresponding to the pulse transformer 520 shown in FIG. 10) is configured to operably synchronize the switching operations of a primary side power switch QP and a secondary side synchronization switch QSR of the flyback power converter circuit 500. For example, as shown in FIG. 10, the transmission interface 20 of the present invention corresponds to a pulse transformer 520 shown in FIG. 10; the pulse transformer 520 includes the first circuit 21 and the second circuit 22, wherein the first circuit 21 and the second circuit 22 include a winding and another winding of the pulse transformer 520, respectively. The flyback power converter circuit 500 is configured to transmit a signal S from the primary side to the secondary side (as shown in FIG. 10) or transmit a signal S from the secondary side to the primary side. In this embodiment wherein the transmission interface 20 is applied to the above-mentioned flyback power converter circuit 500, in one embodiment, the integrated circuit (e.g., the integrated circuit IC1 shown in FIG. 8) including at least the first sub-winding unit 211 and the second sub-winding unit 221 can further include a primary side control circuit (e.g. the primary side control circuit 100 in FIG. 10) and a secondary side control circuit (e.g. the secondary side control circuit 200 in FIG. 10) of the flyback power converter circuit 500. In one embodiment, the operation circuit 40 of the embodiment shown in FIG. 8 corresponds to the primary side control circuit 100 or the secondary side control circuit 200 of the flyback power converter circuit 500.

Please still refer to FIG. 9. As described above, according to the present invention, in one embodiment, the first integrated circuit IC1 can be stacked with another integrated circuit, so as to be integrated into one integrated circuit package. In one embodiment, the third integrated circuit IC3 can include a primary side control circuit or a secondary side control circuit (corresponding to the primary side control circuit 100 or the secondary side control circuit 200 in FIG. 10) of the flyback power converter circuit 500.

In the above-mentioned embodiment, because the first circuit 21 and the second circuit 22 are electromagnetic coupled to each other but not indirect connection, a current flowing through the first circuit 21 does not directly flow to the second circuit 22, and/or, a current flowing through the second circuit 22 does not directly flow to the first circuit 21.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A transmission interface, comprising:
   a first circuit; and
   a second circuit;
   wherein the transmission interface is configured to operably transmit a signal from the first circuit to the second circuit or transmit the signal from the second circuit to the first circuit;

wherein the first circuit comprises a first sub-winding unit and a first wire unit which are electrically connected to each other;

wherein the second circuit comprises a second sub-winding unit;

wherein the first sub-winding unit and the second sub-winding unit are electromagnetically coupled to each other, so that the transmission interface transmits the signal by means of electromagnetic induction between the first sub-winding unit and the second sub-winding unit;

wherein:

when an electromagnetic noise passes through the first sub-winding unit and the first wire unit, a first sub-winding loop current is generated at the first sub-winding unit, while, a first counter loop current is generated at the first wire unit; wherein a direction of the first sub-winding loop current is opposite to a direction of the first counter loop current, so as to reduce a first net noise current generated at the first circuit caused by the electromagnetic noise; or when an emitting current corresponding to the signal flows through the first circuit, a first forward loop current is generated at the first sub-winding unit and a first forward magnetic field is generated along a first forward direction, whereas, a first backward loop current is generated at the first wire unit and a first backward magnetic field is generated along a first backward direction, the first forward direction being opposite to the first backward direction, so as to reduce a first net electromagnetic interference (EMI) generated at the first circuit caused by the emitting current.

2. The transmission interface of claim 1, wherein the first sub-winding unit and the second sub-winding unit are formed on a first integrated circuit in a form of at least one conductive layer.

3. The transmission interface of claim 2, wherein the first sub-winding unit and the second sub-winding unit are electromagnetically coupled to each other and each of which includes a circular or a spiral layout.

4. The transmission interface of claim 3, wherein a layout plane of the circular or spiral layout of the first sub-winding unit and a layout plane of the circular or spiral layout of the second sub-winding unit are substantially in parallel with an upper surface of a substrate of the first integrated circuit.

5. The transmission interface of claim 4, wherein the second circuit further comprises a second wire unit which is electrically connected to the second sub-winding unit;

wherein:

when the electromagnetic noise passes through the second sub-winding unit and the second wire unit, a second sub-winding loop current is generated at the second sub-winding unit, while, a second counter loop current is generated at the second wire unit; wherein a direction of the second sub-winding loop current is opposite to a direction of the second counter loop current, so as to reduce a second net noise current generated at the second circuit caused by the electromagnetic noise; or when the emitting current corresponding to the signal flows through the second circuit, a second forward loop current is generated at the second sub-winding unit and a second forward magnetic field is generated along a second forward direction, whereas, a second backward loop current is generated at the second wire unit and a second backward magnetic field is generated along a second backward direction, the second forward direction being opposite to the second backward direction, so as to reduce a second net electromagnetic interference (EMI) generated at the second circuit caused by the emitting current.

6. The transmission interface of claim 5, wherein the transmission interface comprises at least one of the following features:

(1) a first layout formed by the first sub-winding unit and the first wire unit which are electrically connected to each other at least comprises a first cross-over, whereby the direction of the first sub-winding loop current is opposite to the direction of the counter loop current or the first forward direction is opposite to the first backward direction; and/or (2) a second layout formed by the second sub-winding unit and the second wire unit which are electrically connected to each other at least comprises a second cross-over, whereby the direction of the second sub-winding loop current is opposite to the direction of the counter loop current or the second forward direction is opposite to the second backward direction.

7. The transmission interface of claim 5, wherein each of the first wire unit and the second wire unit includes a circular or a spiral layout.

8. The transmission interface of claim 7, wherein the first wire unit and/or the second wire unit is formed by: (1) one or more bonding wires; or (2) one or more conductive layers on a printed circuit board.

9. The transmission interface of claim 7, wherein the first wire unit and the second wire unit are formed by one of the following configurations:

(1) the first wire unit and the second wire unit are both formed on the first integrated circuit;

(2) the first wire unit and the second wire unit are both formed on a second integrated circuit;

(3) the first wire unit is formed on the first integrated circuit, whereas, the second wire unit is formed on the second integrated circuit; or (4) the first wire unit is formed on the second integrated circuit, whereas, the second wire unit is formed on a third integrated circuit;

wherein each of the first wire unit and the second wire unit is in a layout plane which is in parallel with the a substrate of the corresponding integrated circuit.

10. The transmission interface of claim 5, wherein the first wire unit and the second wire unit are electromagnetically coupled to each other, so that the transmission interface further transmits another signal by means of electromagnetic induction between the first wire unit and the second wire unit.

11. The transmission interface of claim 10, wherein the first sub-winding unit and the first wire unit are connected in series, while, the second sub-winding unit and the second wire unit are connected in series.

12. The transmission interface of claim 10, wherein:

(1) the first wire unit and the second wire unit are both formed on the first integrated circuit; or (2) the first wire unit and the second wire unit are both formed on a second integrated circuit;

wherein each of the first wire unit and the second wire unit includes a circular or a spiral layout; and wherein a layout plane of the circular or spiral layout of the first sub-winding unit and a layout plane of the circular or spiral layout of the second sub-winding unit are substantially in parallel with an upper surface of a substrate of the corresponding integrated circuit.

13. The transmission interface of claim 12, wherein the transmission interface is applied to a flyback power converter circuit; and wherein the transmission interface is configured to operably transmit the signal between a primary side and a secondary side of the flyback power converter circuit.

14. The transmission interface of claim 13, wherein the transmission interface is configured to operably synchronize switching operations between a primary side power switch and a secondary side synchronization switch of the flyback power converter circuit.

15. The transmission interface of claim 13, wherein the transmission interface is applied to a flyback power converter circuit; and wherein the first integrated circuit includes a primary side control circuit or a secondary side control circuit of the flyback power converter circuit.

16. The transmission interface of claim 12, wherein the first sub-winding unit, the first wire unit, the second sub-winding unit and the second wire unit are in a same conductive layer at a same level, or at least two of the first sub-winding unit, the first wire unit, the second sub-winding unit and the second wire unit are in different conductive layers at different levels.

17. The transmission interface of claim 12, wherein the first integrated circuit and a third integrated circuit are stacked one on the other to integrated into an integrated circuit package.

18. The transmission interface of claim 17, wherein the transmission interface is applied to a flyback power converter circuit; and wherein the third integrated circuit includes a primary side control circuit or a secondary side control circuit of the flyback power converter circuit.

19. The transmission interface of claim 5, wherein:
(1) an equivalent induction area enclosed by the first sub-winding unit is approximately equal to an equivalent induction area enclosed by the first wire unit, so that the first net noise current or the first net electromagnetic interference (EMI) is approximately equal to zero; and/or
(2) an equivalent induction area enclosed by the second sub-winding unit is approximately equal to an equivalent induction area enclosed by the second wire unit, so that the second net noise current or the second net electromagnetic interference (EMI) is approximately equal to zero.

20. The transmission interface of claim 5, wherein at least part of the induction area of the first wire unit and part of the induction area of the second wire unit overlap with each other, so that an electromagnetic coupling interaction is achieved between the first wire unit and the second wire unit; and/or at least part of the induction area of the first sub-winding unit and part of the induction area of the second sub-winding unit overlap with each other, so that an electromagnetic coupling interaction is achieved between the first sub-winding unit and the second sub-winding unit.

21. The transmission interface of claim 2, wherein the first integrated circuit includes an operation circuit having at least one operation device, and at least part of the at least one operation device is formed below an upper surface of a substrate of the first integrated circuit.

22. The transmission interface of claim 1, wherein a current flowing through the first circuit does not directly flow to the second circuit; or wherein a current flowing through the second circuit does not directly flow to the first circuit.

23. The transmission interface of claim 1, wherein the first circuit and the second circuit form a transformer; and wherein the first circuit and the second circuit include a winding and another winding of the transformer, respectively.

* * * * *